US012607456B2

(12) United States Patent
Gu et al.

(10) Patent No.: US 12,607,456 B2
(45) Date of Patent: Apr. 21, 2026

(54) WIDE FIELD-OF-VIEW METASURFACE OPTICS, SENSORS, CAMERAS AND PROJECTORS

(71) Applicant: 2Pi Inc., Cambridge, MA (US)

(72) Inventors: Tian Gu, Acton, MA (US); Fan Yang, Cambridge, MA (US); Mikhail Y. Shalaginov, Cambridge, MA (US); Xiaochen Sun, Chino Hills, CA (US); Juejun Hu, Newton, MA (US)

(73) Assignee: 2Pi Inc., Cambridge, MA (US)

( * ) Notice: Subject to any disclaimer, the term of this patent is extended or adjusted under 35 U.S.C. 154(b) by 453 days.

(21) Appl. No.: 18/485,698

(22) Filed: Oct. 12, 2023

(65) Prior Publication Data

US 2024/0125591 A1      Apr. 18, 2024

Related U.S. Application Data

(60) Provisional application No. 63/415,651, filed on Oct. 12, 2022.

(51) Int. Cl.
*G01B 11/22* (2006.01)
*G02B 1/00* (2006.01)
(52) U.S. Cl.
CPC .............. *G01B 11/22* (2013.01); *G02B 1/002* (2013.01)
(58) Field of Classification Search
CPC .......... G01B 11/22; G01B 11/24; G02B 1/002
See application file for complete search history.

(56) References Cited

U.S. PATENT DOCUMENTS

| | | |
|---|---|---|
| 2017/0359566 A1 | 12/2017 | Goma et al. |
| 2021/0028215 A1 | 1/2021 | Devlin et al. |
| 2021/0044748 A1 | 2/2021 | Hu et al. |
| 2021/0288095 A1 | 9/2021 | Delga et al. |
| 2022/0155504 A1* | 5/2022 | Hsieh ..................... G02B 1/002 |

OTHER PUBLICATIONS

International Search Report in the related PCT application No. PCT/US23/76662, dated Apr. 2, 2024.
Shalaginov et al., "Single-Element Diffraction-Limited Fisheye Metalens", Nano Letters, 2020, vol. 20, pp. 7429-7437.

(Continued)

*Primary Examiner* — Collin X Beatty
(74) *Attorney, Agent, or Firm* — Chen Yoshimura LLP

(57) ABSTRACT

A wide field-of-view sensor or projector includes a transparent substrate with one or more apertures on one side, and one or more chip stacks joined to the opposite side. Each chip stack includes a flat optics layer (e.g., metasurface), at least one spacer layer, an optional filter layer, and either an image sensor or a light source. In one example, two apertures and two corresponding chip stacks are provided; both chip stacks include image sensors but different metasurfaces and filters to capture different information from the scene. In an alternative embodiment, the two chip stacks include a light source and an image sensor, to function as a light projector and a light receiver, respectively. In other examples, two apertures and a single chip stack are provided, where the single chip stack include two metasurface and/or two filters corresponding to the two apertures.

23 Claims, 14 Drawing Sheets

(56)                    References Cited

OTHER PUBLICATIONS

Yang et al., "Wide field-of-view flat lens: an analytical formalism", physics.optics, Aug. 24, 2021, arXiv:2108.09295v2.
Yang et al., "Design of broadband and wide-field-of-view metalenses", Optics Letters, Nov. 15, 2021, vol. 46, No. 22, pp. 5735-5738.
Yang et al., "Reconfigurable parfocal zoom metalens", Advanced Optical Materials, 2022, vol. 10, 2200721.
Zhou et al., "Multifunctional metaoptics based on bilayer metasurfaces", Light Science & Applications, 2019, 8:80.

* cited by examiner

S81: Metasurface fabrication, encapsulation

S82: Aperture piece fabrication

S83: Aperture-metasurface bonding

S84: Spacer/filter fabrication

S85: Spacer/filter bonding

S86: Meta-optics singulation/dicing

S87: Lens to image sensor bonding, Lens/spacer edge blackening/roughening

WIDE FIELD-OF-VIEW METASURFACE OPTICS, SENSORS, CAMERAS AND PROJECTORS

BACKGROUND OF THE INVENTION

The present invention is related to optics and optical systems, particularly related to metasurfaces, metamaterials, imaging, sensing, projection, 3-D sensors and depth sensing.

3-D depth sensing is an important technology for applications spanning biometric identification, automotive sensing, AR/VR, robotics and industrial automation. Existing 3-D optical sensors based on structured light, time-of-flight (TOF), or stereoscopic technologies are typically assembled from traditional bulk refractive optics and discrete components. The sensor optics involve multiple stacked lenses, which increases module thickness and assembly complexity. Moreover, current 3-D sensors are constrained by a small field-of-view (FOV, the angular extent of objects of scenes that can be imaged by an optical system) typically less than 90° and lateral/spatial resolution usually limited to around 1,000×1,000 or less. Further improving the performance necessarily entails adding more elements when conventional optics are used. The trade-off between optical performance and thickness presents an increasing challenge toward miniaturization of embedded sensors in mobile phones and other small electronic devices, as well realizing new architectures. The prevailing multi-element optical architecture thereby hampers further performance and cost scaling of 3-D sensors.

SUMMARY OF THE INVENTION

Accordingly, the present invention is directed to imaging, sensing and/or projection systems, e.g., 3-D sensing systems, and related methods that substantially obviate one or more of the problems due to limitations and disadvantages of the related art.

Embodiments of the present invention provides novel imaging and sensing systems based on flat lens optics featuring superb optical performance, structural simplicity, and a compact footprint as compared to its traditional counterpart based on bulk refractive optics.

The imager, sensor, or projector architectures, designs, and module configurations according to embodiments of the present invention leverage novel optical metasurface architectures and packaging process to circumvent the complex multi-element assembly while enhancing the optical performance compared to existing sensors. The imager, sensor, or projector design simultaneously claims large FOV (>90°), high resolution, and a compact form factor. In addition, it features an architecturally simple construction with a minimal element count and full compatibility with wafer-scale assembly and packaging, thereby presenting a significant advantage for scalable manufacturing and cost reduction.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides sensor device which includes: a transparent substrate; an opaque material layer over a first side of the substrate that contains at least one aperture; a chip stack joined to a second side of the substrate opposite the first side, the chip stack including: a flat optics layer; at least one spacer layer; and an image sensor, located at a defined distance from the flat optics layer.

In another aspect, the present invention provides a projector device which includes: a transparent substrate; an opaque material layer over a first side of the substrate that contains at least one aperture; a chip stack joined to a second side of the substrate opposite the first side, the chip stack including: a flat optics layer; at least one spacer layer; and a light source or light source array, located at a defined distance from the flat optics layer.

In some embodiments of sensor or projector device, the flat optics layer includes a metasurface, a diffractive optical element, a hologram, or a gradient refractive index (GRIN) optical element. In some embodiments, the flat optics layer is formed of a metasurface structure which is configured to control the optical phase, amplitude, polarization and/or spectrally, angularly and/or polarization dependent transmission, reflection and/or beam shaping profiles of an incident light.

In some embodiments of sensor or projector device, the chip stack further includes a filter layer.

In some embodiments of sensor or projector device, the device further includes a printed circuit board, wherein the image sensor or light source or light source array, as well as other relevant electrical components, are mounted on the printed circuit board.

In some embodiments of the sensor device, the at least one aperture includes a first aperture and a second aperture, the sensor further including a second chip stack which includes: a second flat optics layer; at least one second spacer layer; and a second image sensor, located at a defined distance from the second flat optics layer, wherein the chip stack and the second chip stack respectively spatially correspond to the first and second apertures, wherein the flat optics layer and the second flat optics layer are configured to perform different functions according to different properties of light.

In some embodiments of the sensor device, the at least one aperture includes a first aperture and a second aperture, and a single chip stack corresponds to both apertures.

In another aspect, the present invention provides a sensor device that includes a transparent substrate; an opaque material layer over a first side of the substrate that contains at least one aperture; a first chip stack and a second chip stack joined to a second side of the substrate opposite the first side, the first chip stack including: a first flat optics layer; at least one first spacer layer; and an image sensor, located at a defined distance from the first flat optics layer; the second chip stack including: a second flat optics layer; at least one second spacer layer; and a light source or light source array, located at a defined distance from the second flat optics layer. In some embodiments, the sensor device further includes a printed circuit board, wherein the image sensor and the light source or light source array are mounted on the printed circuit board.

It is to be understood that both the foregoing general description and the following detailed description are exemplary and explanatory and are intended to provide further explanation of the invention as claimed.

DETAILED DESCRIPTION OF THE INVENTION

Embodiments of the present invention can be broadly utilized in imaging, sensing, and projection optical systems, as well as systems combining such functionalities.

Figure 1A:
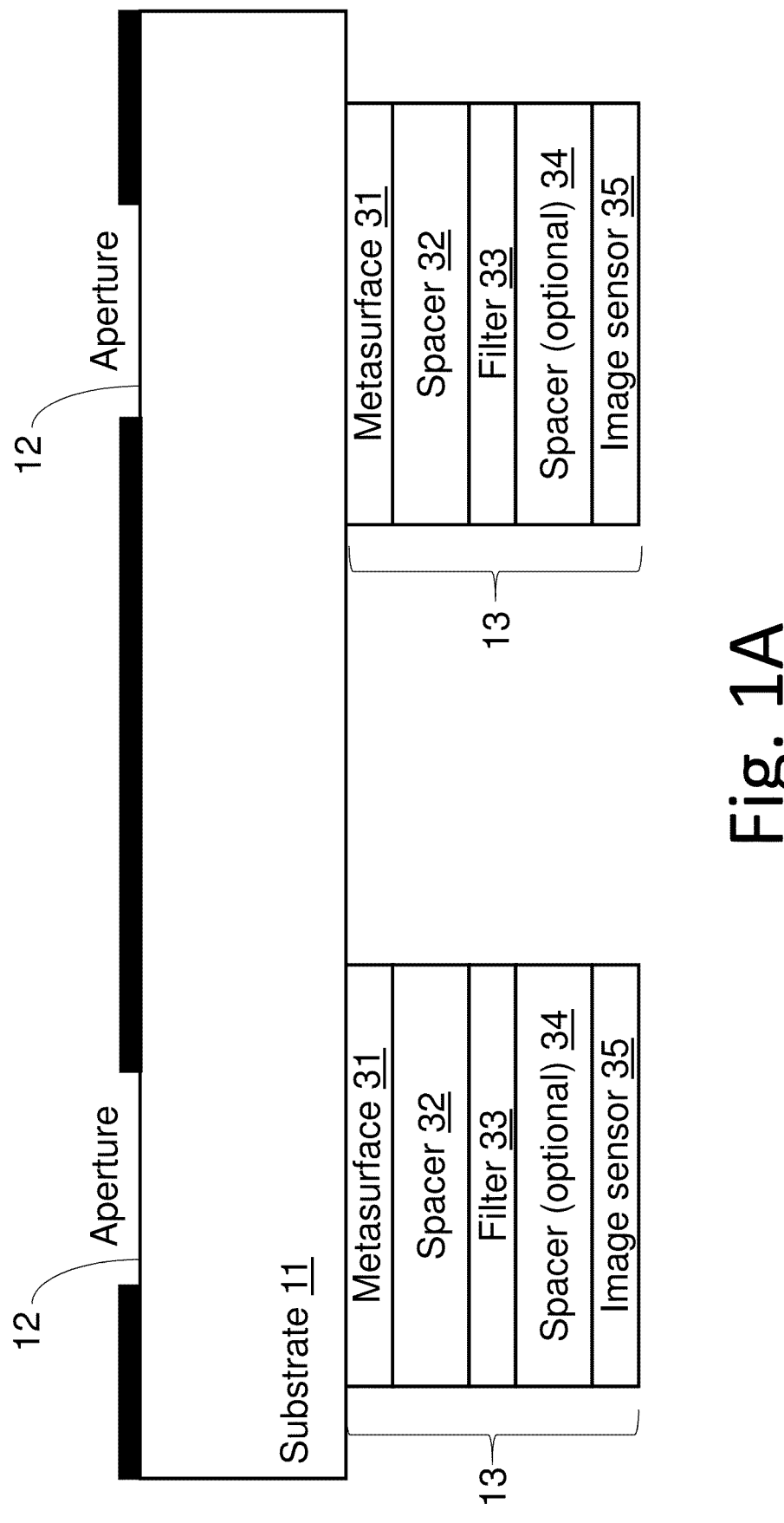
FIGS. 1A and 1B schematically illustrate two sensor/imagers useful for 3-D sensors or other imaging, sensing, or projection applications according to two embodiments of the present invention, each having multiple chip stacks corresponding to multiple apertures.
Figure 1B:
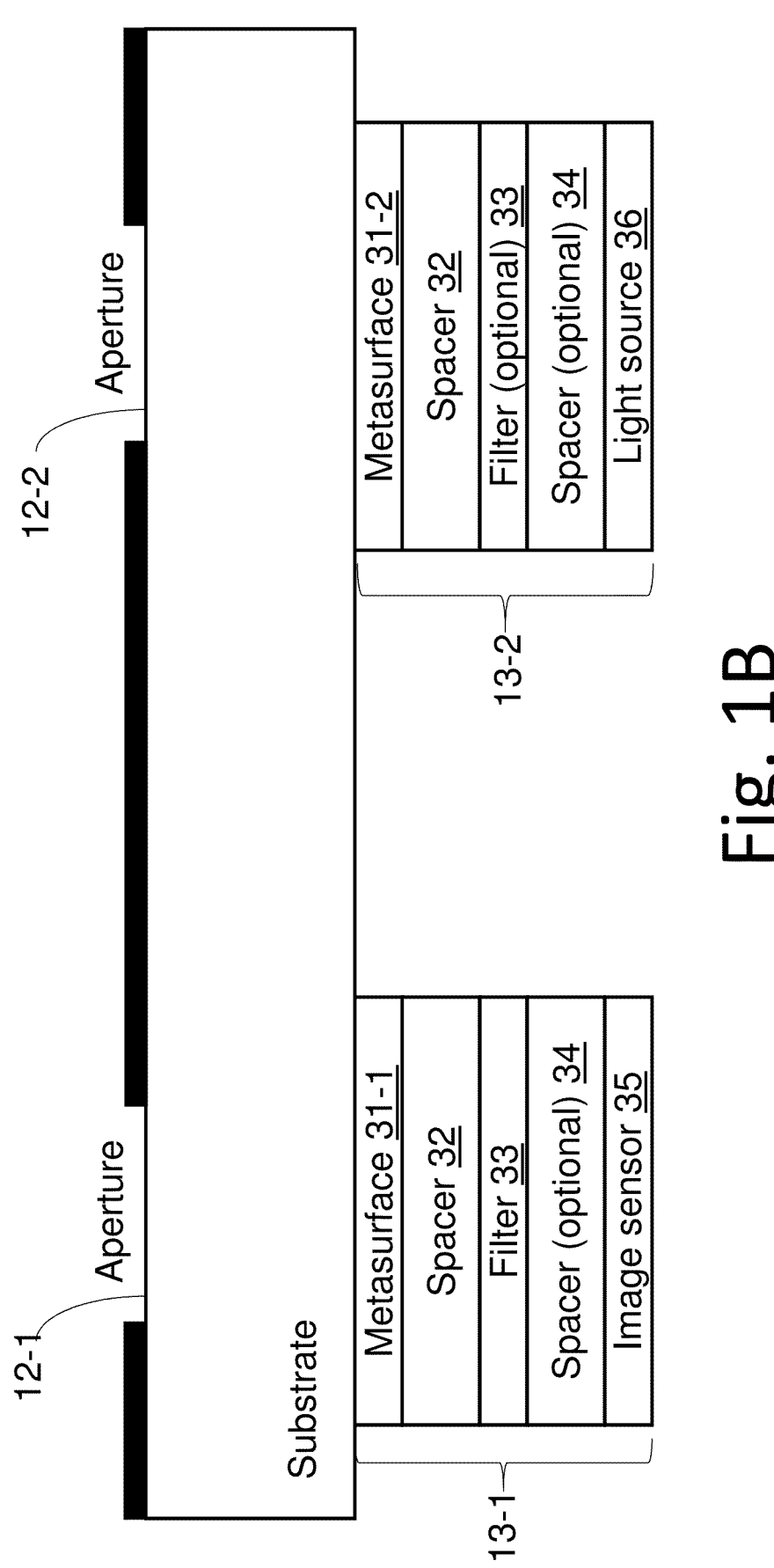

FIGS. 1A and 1B schematically illustrate two sensor/imagers (which could be used for 3-D sensors or other imaging, sensing, or projection applications) according to two embodiments of the present invention. Each sensor includes a transparent substrate 11, which acts as the mechanical support for other components. The substrate 11 can also function as a micro-optical bench, and in this case its surfaces are patterned to form mechanical alignment features to aid passive assembly of the components.

In the embodiment shown in FIG. 1A, the front side (object side) of the substrate 11 is covered by an opaque material which is patterned to form one, two or more apertures 12. This can be accomplished by defining apertures in an opaque layer, e.g., metal or black ink, using e.g., lithography or printing methods, as well as by assembling a separate opaque layer, window or light baffle containing the apertures onto the substrate. On the backside, one, two or more chip stacks 13 are assembled (e.g. bonded) to the substrate 11 and spatially correspond to the apertures 12. Each stack 13 includes a flat optics layer 31, one or more spacers (which may be air gaps) 32 and 34 (two are shown in this example, but the second one is optional), a filter 33, and an image sensor 35. The flat optics layer 31 may be a metasurface, a diffractive optical element, a hologram, a gradient refractive index (GRIN) optical element, etc. The descriptions below use metasurfaces as an example. Metasurface is defined herein as comprising sub-wavelength structures (i.e., meta-atoms) fabricated or assembled on a substrate to impart spatially varying optical phase delay and/or amplitude or polarization modulation onto an incident wavefront. The meta-atoms and the substrate may be made of the same or different optical materials. The meta-atoms are designed to change the phase, amplitude, and/or polarization of incident light. The meta-atoms may have the same or different geometries, dimensions, orientations, and/ or pitches. Exemplary geometries may include rectangular, cylindrical, freeform, or any other suitable shapes or combinations of different shapes, etc. The pitch or lattice of the meta-atoms may have any suitable shape and period (e.g., square, rectangular, or hexagonal). The lattice may also be aperiodic, with varying or random distances between adjacent meta-atoms. In some examples, the gap between adjacent meta-atoms may be designed to have a constant gap distance. One or both sides of the substrate may be flat or curved. Both the metasurface and the substrate may be rigid, flexible, or stretchable. The substrate may also include a spacer.

The geometries, dimensions, and layout of the meta-atoms and substrate are designed to provide the target optical functions. The metasurfaces may be designed to operate at a single wavelength, multiple wavelengths, or over a continuous spectral range. The metasurface may be designed to provide different functions depending on the properties of the incident light (e.g., polarization, wavelength, incident/exiting angle, intensity, etc.).

Each metasurface 31 combined with the corresponding aperture 12 form a wide FOV metalens capable of high-resolution imaging across a FOV up to 180°. In its baseline form, light transmitted through the aperture 12 is focused or re-directed by the metasurface 31 (with or without an additional optical filter) onto the image sensor 35 over a wide FOV. The metasurface lens (or metalens) can be designed to operate at infrared wavelengths (e.g., 850 nm or 940 nm) such that it is invisible to human eye, as well as other wavelengths (e.g., in the visible spectrum). It may also be designed for broadband operations.

The filter 33 may be a spectral, angular, and/or polarization filter. The filter may be in the forms of a multi-layer filter, cavity structures, diffractive optical elements, slanted gratings, or a metasurface that performs the above filtering function(s). An angular filter (e.g., some cavity structures, diffractive optical elements, or metasurfaces that exhibit angular selectivity) may be used to block or reduce stray light or form a self-limiting aperture depending on the incident or exiting angle of light. Polarization filters may also be useful in cases where the metalens is designed to polarization sensitive. A metasurface may also serve as the filter.

One feature of this embodiment is that it allows angle-selective filtering of background ambient light to boost signal-to-noise ratio (SNR), which is not possible with conventional multilayer filters when applied to wide-field imaging. This is made possible by the (near-) telecentric configuration of the metalens, which means that light coming from different angles of incidence (AOIs) on the object side will leave the metalens only within its surface-normal (or near normal, e.g., within 20 degrees from normal) exit cone. In other words, at any AOI, the chief ray of the incident light leaves the metasurface at a direction normal (or near normal, e.g., within 20 degrees from normal) to the metasurface. Therefore, the tight distribution of light angles on the image side allows the use of a single bandpass filter to efficiently reject ambient background light from all AOIs. Meanwhile, meta-atoms positioned at different locations of the metasurface can be designed differently (e.g., according to the AOIs) to provide enhanced angularly or spatially dependent responses.

The metasurface 31 and filter 33 can be further assembled (e.g. bonded) onto an image sensor 35 via optical adhesives, which also serves as spacers to control the separation between the different components. The sensor is the outermost layer of the chip stack; the spatial sequence of the metasurface 31, filter 33, spacers or air gaps 32 and 34 may be altered from that shown in FIG. 1A, so long as the image sensor is located at a defined distance from the metasurface. For example, the spacer or air gap 32 may be located between the filter layer 33 and the image sensor 35 and not present between the metasurface and the image sensor.

The spacers or air gaps 32 and 34, which function to define the distances between various layers, may be made of glass, plastic, etc. or a stack of materials, or air-gaps. For example, in a wafer level optics structure, the spacer may be a layer of material of a desired thickness with a hollow cutout in the area corresponding to the location of the aperture to achieve an air gap. Alternatively, the entire layer may be air, and an external mechanical structure may be used to hold the other components to form the air gap. In this application, the term "spacer" includes an air gap, which may be formed by either of the above two structures or other suitable structures.

In an alternative embodiment, the two metasurfaces 31 corresponding to the two apertures 12 may perform different functions according to different properties of light (e.g., AOI, polarization, wavelength, etc.) and the two filters 33 may have different light filtering properties accordingly. As a result, different image sensors 35 may capture different information from the scene (e.g., different FOVs, AOIs, polarization, and/or spectral information, etc.), depending on the corresponding metasurface and filter structures.

In the embodiment shown in FIG. 1B, the two chip stacks 13-1 and 13-2 function as a light projector and a light receiver, respectively. In this case, in the second stack 13-2, the image sensor is replaced by a light source 36 (e.g., a light emitting diode LED or vertical cavity surface emitting laser VCSEL, LED/VCSEL arrays, or display array, etc.). The filter 33 is optional in this stack. The second metasurface 31-2 in the second chip stack 13-2 is designed as a pattern projector or illuminator. The basic function of the second metasurface 31-2 is to transform the emission from the light source(s) into a defined 2-dimensional or 3-dimensional optical intensity distribution (e.g., an array of separate beams which densely populate the angular space, a structured pattern, etc.). The beams exiting from the second aperture 12-2 in front of the second metasurface 31-2 then form the projected dot pattern. In one example, the solid immersion structure (i.e. without any airgap) of the second metasurface 31-2 enables the output beams to span the entire front hemisphere upon refraction on the top surface of the substrate 11. Besides dot arrays, the second metasurface 31-2 can also be readily designed to output other structured or diffusive light patterns with desired intensity distribution (e.g., images, dots, lines, random patterns, or any other light intensity distribution patterns). In an imager module, the first metasurface 31-1 in the first chip stack 13-1 along with the integrated image sensor 35 then forms the light receiver for capturing the scene illuminated by the light source or ambient light. In a 3-D sensor module, the first metasurface 31-1 in the first chip stack 13-1 along with the integrated image sensor 35 then forms the light receiver for capturing the reflection of the dot pattern, from which the depth information can be inferred using structured light or TOF techniques.

In other embodiments (e.g. FIGS. 2A-2D), multiple apertures may be integrated with a single chip stack and/or a single image sensor to realize stereoscopic imaging. A single flat (planar) optics layer may carry one or multiple metasurfaces designed to modulate the properties (phase, amplitude, and/or polarization) of light coming from the multiple corresponding apertures. For example, different regions of the metasurface may be designed for different apertures. In another example, a metasurface may be designed to have multiplexed functions so that light incident from different apertures is modulated differently.

Figure 2A:
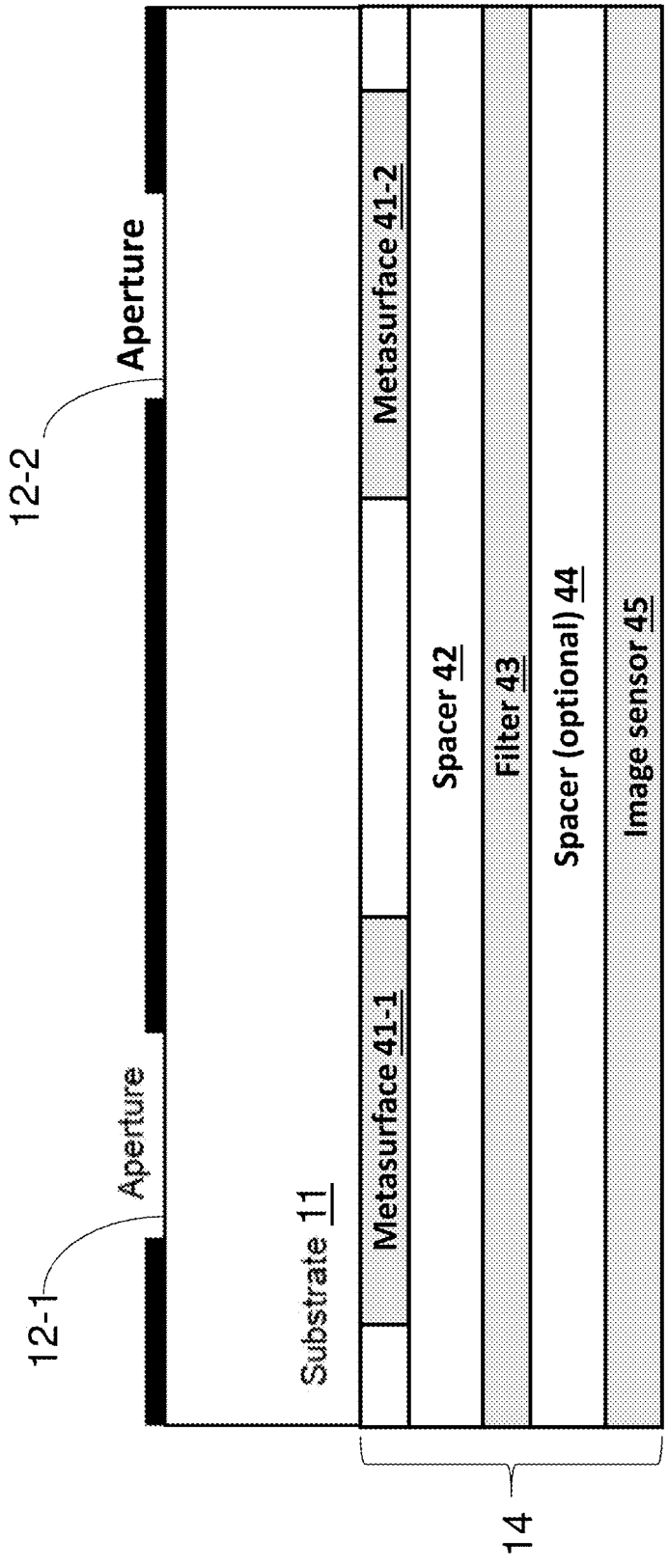
FIGS. 2A to 2D schematically illustrate sensor/imagers useful for 3-D sensors or other imaging, sensing, or projection applications according to additional embodiments of the present invention, each having a single chip stack corresponding to multiple apertures.

An example is schematically illustrated in FIG. 2A, in which two metasurfaces 41-1 and 41-2 in the single chip stack 14 corresponding to two apertures 12-1 and 12-2 couple light to two different areas of a single image sensor 45. The image sensor 45 is integrated with a filter 43; both are sufficiently large to spatially overlap the areas of the two metasurfaces. The captured images can then be used for generating 3-D images. One or two spacers 42 and 44 may also be provided in the chip stack 14. Different from existing 3-D sensing technologies that require multiple discretely assembled optical modules, the highly-integrated all-planar architecture in this embodiment allows significantly simplified assembly process, improved performance with minimal misalignment, ultra-compact module configurations, and reduced costs.

Figure 2B:
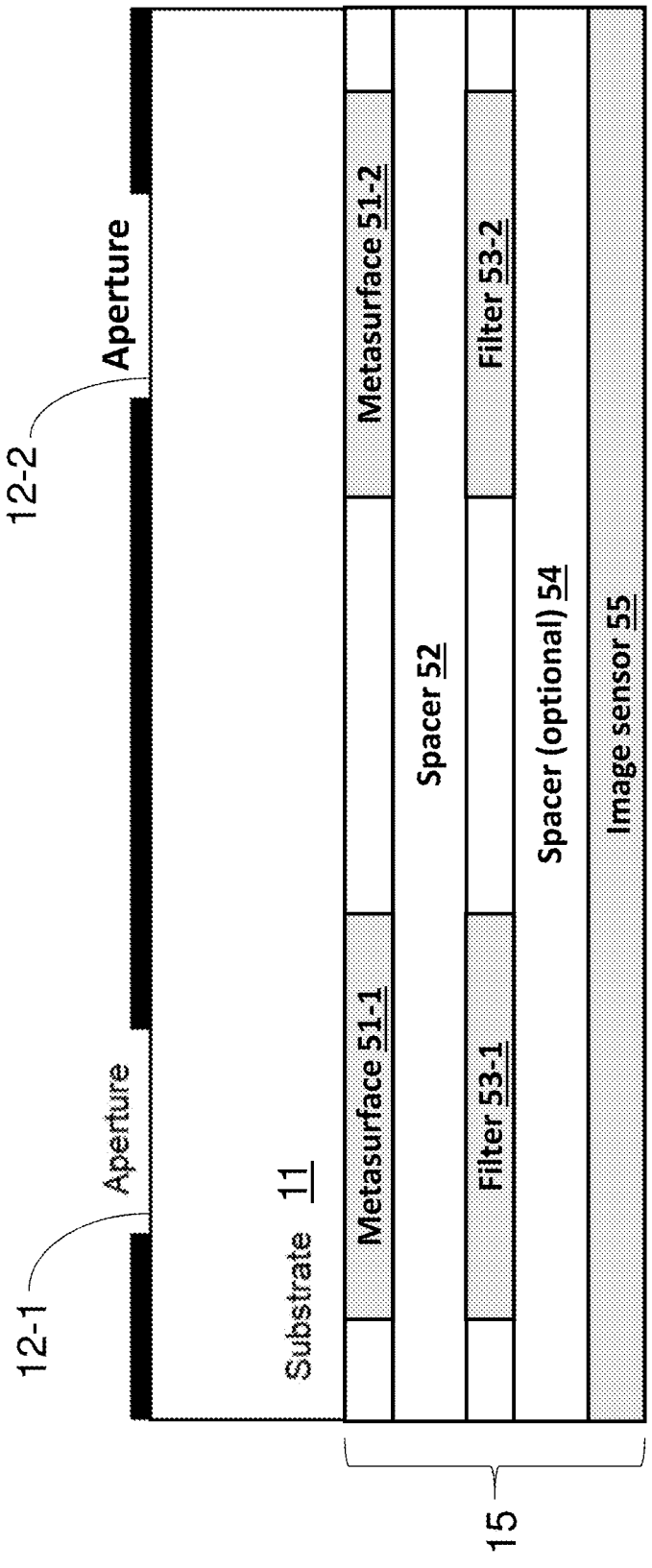

Another example is schematically illustrated in FIG. 2B. In this embodiment, instead of a single filter, the single chip stack 15 includes multiple filters/filter zones 53-1 and 53-2, referred to as pixelated filter arrays, coupled with the corresponding metasurfaces 51-1 and 51-2 or the image sensor 55. In some examples, the metasurfaces 51-1 and 51-2 may be configured according to the filter properties so that different regions or pixels of the image sensor 55 may capture different information of the scene (e.g., different AOIs, polarization, and/or spectral information, etc.). Pixelated filter arrays 53-1 and 53-2 may be directly integrated on the image sensor and registered to the pixels. One or two spacers 52 and 54 may also be provided in the chip stack 15.

Figure 2C:
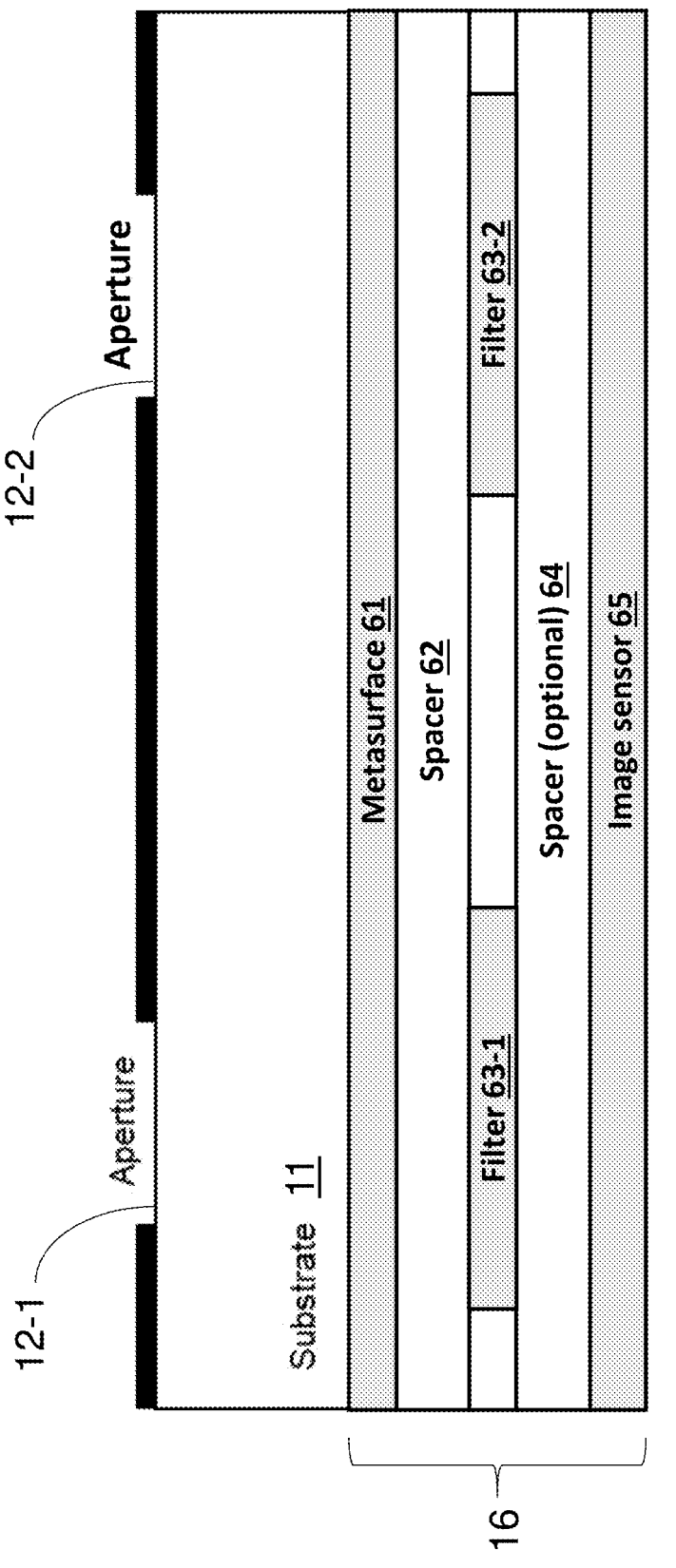

In another example schematically illustrated in FIG. 2C, in the single chip stack 16, a single metasurface 61 may be designed to provide multiplexed functions so that it performs different optical modulation depending on the light properties (polarization, wavelength, AOI, etc.). Two or more filters or pixelated filter arrays 63-1 and 63-2 with different light filtering properties according to the metasurfaces functions may be coupled with the image sensor 65. Consequently, different regions or pixels of the image sensor 65 may capture different information of the scene (e.g., different AOIs, polarization, and/or spectral information, etc.), depending on the corresponding metasurface and filter structures. Again, one or two spacers 62 and 64 may also be provided in the chip stack 16.

Figure 2D:
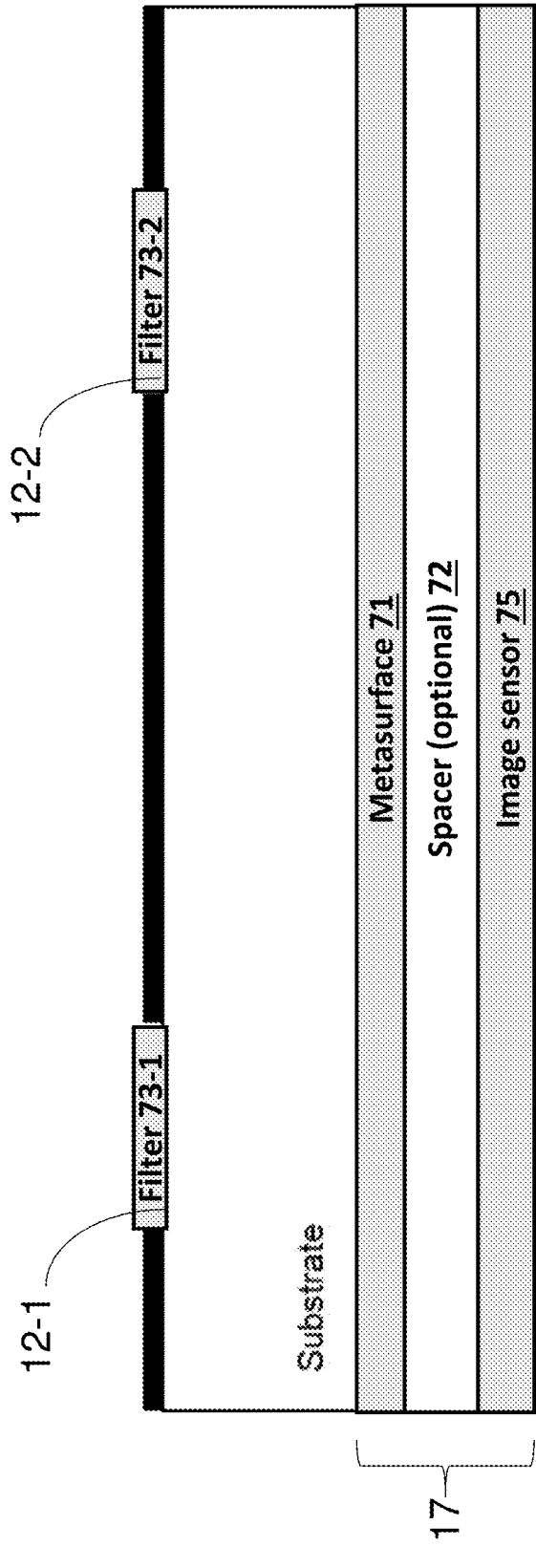

In another example schematically illustrated in FIG. 2D, the filters 73-1 and 73-2 may be integrated on the front side of the substrate 11, on or near and covering the apertures 12-1 and 12-2, respectively. A metasurface may be used as each of the filters. The single chip stack 17 on the back side of the substrate 11 includes a metasurface 71, a spacer 72 and an image sensor 75.

Figure 3:
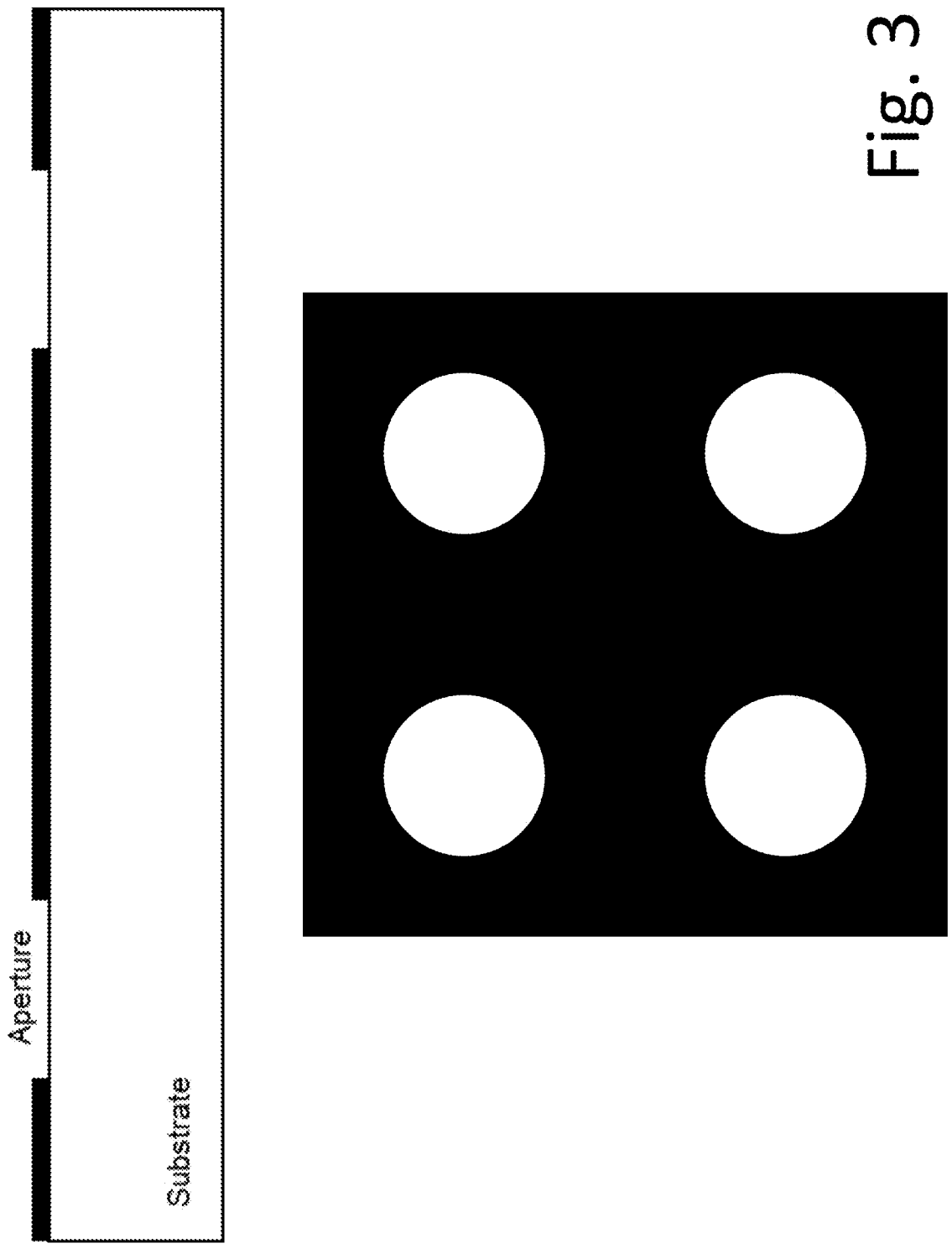
FIG. 3 schematically illustrates a substrate with four apertures useful in some embodiments of the present invention.

In a further embodiments, more than two apertures may be used to provide full-range stereoscopic sensing in both horizontal and vertical directions, as depicted in a top view in the lower part of FIG. 3 (four apertures are shown), while using a single planar optical layer and a single image sensor according to the embodiments of FIG. 2A, 2B, 2C or 2D.

Figure 4A:
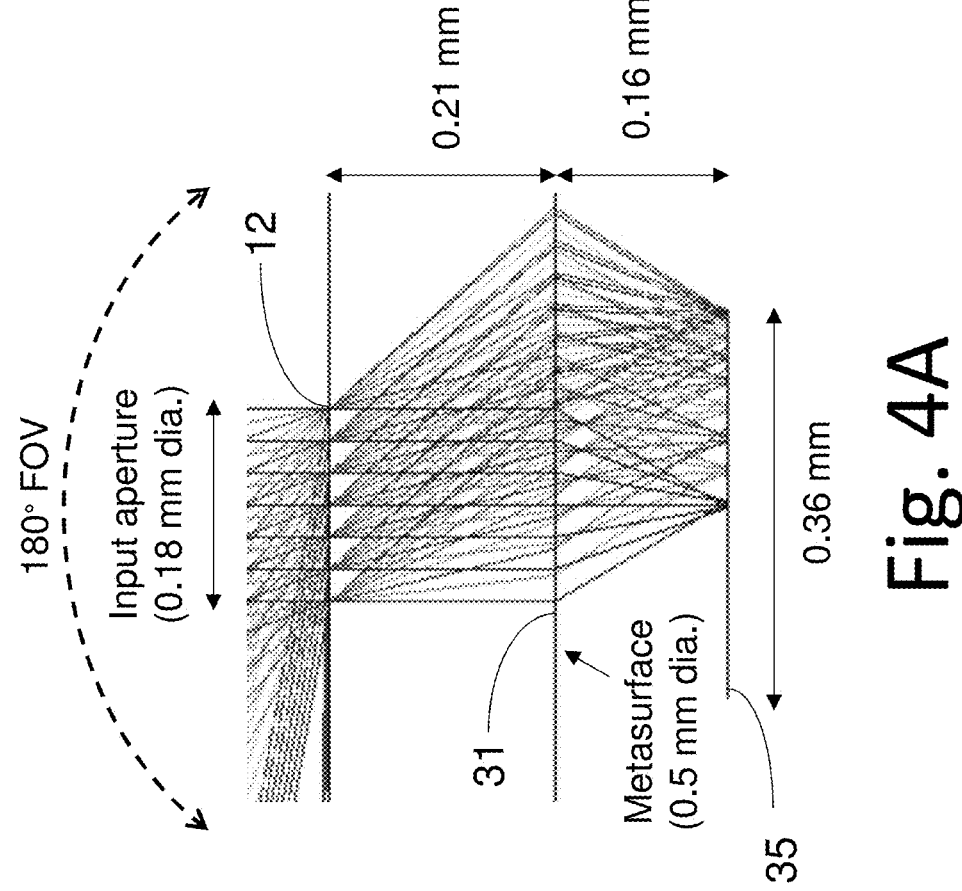
FIGS. 4A and 4B illustrate an exemplary structure and simulated performance of a miniature metasurface imager according to an embodiment of the present invention.
Figure 4B:
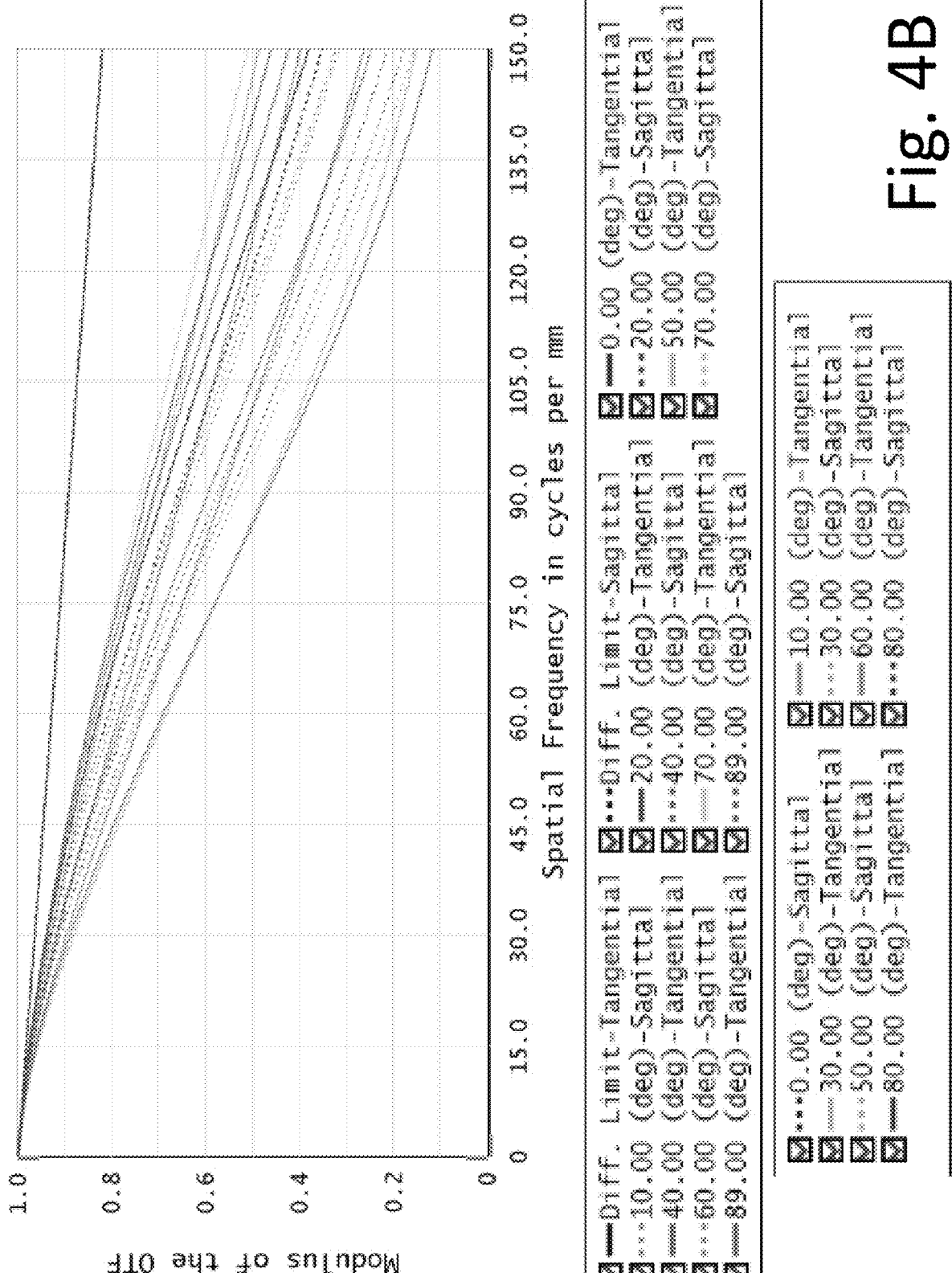

FIGS. 4A and 4B illustrate an exemplary structure and simulated performance of a miniature metasurface imager (camera) according to the embodiment of FIG. 1A (not all layers of the chip stack are illustrated in FIG. 4A). The camera structure accommodates an ultra-compact commercially available CMOS image sensor 35. The metasurface 31 comprises an amorphous Si nano-pillar array on a glass substrate. This type of metasurface structure has been previously described. In the example of FIG. 4, meta-atoms positioned at different locations of the metasurface (according to different AOIs) are designed differently to provide enhanced angularly or spatially dependent responses. The metasurface substrate is assembled (e.g. bonded) to the image sensor and mounted onto a custom ultra-small printed circuit board for image output. In this particular example, the input aperture is 0.18 mm in diameter, the metasurface is 0.5 mm in diameter, and the image sensor area is a 0.36 mm square. The distance between the aperture and the metasurface is 0.21 mm and the distance between the metasurface and the sensor surface is 0.16 mm. The metalens and sensor module achieves a FOV up to 180 degrees with a combined diameter as small as 0.5 mm, an overall thickness less than 0.4 mm and a resolution better than 100 cycles/mm.

FIG. 4A shows ray trace simulations of the imager. FIG. 4B is a plot of simulated modulation transfer functions (MTFs) of the camera, indicating excellent resolution throughout the nearly 180 degree FOV. As shown in FIG. 4A, the metalens has a telecentric configuration, where for all incident angles within the FOV, the chief ray of the incident light leaves the metasurface at a direction normal to the metasurface. As mentioned earlier, a telecentric or near-telecentric configuration of the metalens achieves 180 degree FOV with good image quality even at large angles. In this disclosure, near-telecentric refers to a configuration where the chief ray angle (i.e., the angle at which the chief ray of the incident light leaves the metasurface) is less than 20 degrees for all incident angles. The near-telecentric (including telecentric) configuration is achieved by choices of the metasurface design, and the aperture size relative to the substrate thickness (i.e. the f number). Numerical optimization techniques may be used to achieve such configurations. In various specific examples of sensors having the general structure shown in FIG. 4A, the f number of the metalens range from 0.8 to 8.0.

An important advantage of above-described 3-D sensors according to various embodiments of the present invention is that the single-block chip stack structures can be manufactured using a wafer-level process to achieve excellent alignment accuracy, high fabrication throughput, and low manufacturing cost. Using the image senor stack as an example, the process starts with a complementary metal-oxide-semiconductor (CMOS) image sensor wafer, followed by sequential bonding of the filter and the metasurface. The filter and metasurface are fabricated or assembled on separate substrates (e.g. glass or semiconductor wafers or a polymer substrate), preferably with sizes matching that of the CMOS sensor wafer. The filters can be made out of multilayer thin films which act as interference coatings, or a patterned metasurface layer with tailored spectrally, angularly, and/or polarization dependent transmittance characteristics. In another embodiment, the metasurface and the filter can be combined onto one substrate. For instance, by engineering the metasurface structure such that it controls optical phase and/or spectral, angular and/or polarization-dependent transmission profiles, the metasurface itself can perform the filtering functions as well. Alternatively, metasurface can also be patterned on top of a multilayer interference coating filter. The metasurface may also be sandwiched between two multilayer interference coating filters. In yet another embodiment, a multilayer stacked metasurface structure can be adopted to impart optical phase delay, amplitude modulation, polarization sensitivity, and/or spectral and/or angular filtering on an incident light. Optical adhesives or transparent epoxies can be used as the bonding agent, while at the same time serving as the spacer layer with controllable thickness.

Figure 8:
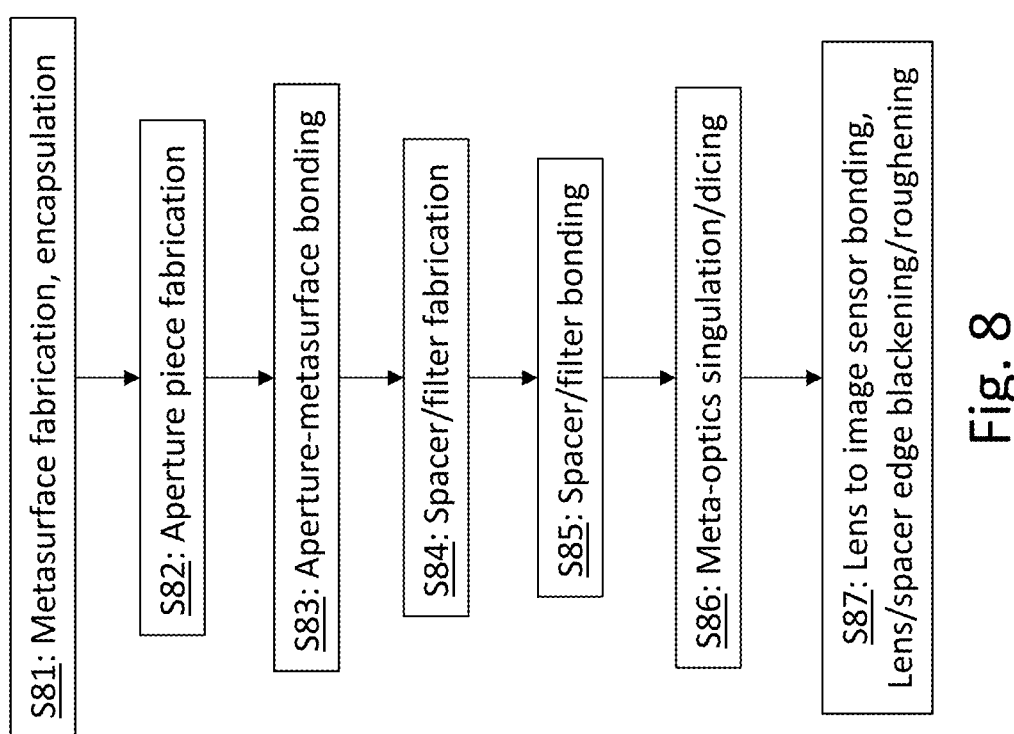
FIG. 8 schematically illustrates a fabrication and assembly process for a sensor module according to an embodiment of the present invention.

Another alternative fabrication and assembly process is illustrated in FIG. 8. In this process, the metasurface is fabricated as one piece, with encapsulation (e.g. using an epoxy or dielectric) (step S81); the aperture is fabricated on the substrate as one piece (step S82); and the spacer and filter are fabricated as one piece (step S83). Each of the above pieces includes multiple units of the relevant structures. The metasurface piece is assembled (e.g. bonded) to the aperture and substrate piece (step S84)); and the spacer and filter piece is then assembled (e.g. bonded) to the metasurface piece (step S85)). The assembled structure is then diced into individual units each containing one (or two) set of aperture, metasurface, and filter forming a metalens (or other meta-optics) (step S86). The metalens is then assembled (e.g. bonded) to an image sensor (step S87). The various bonding steps may use optical adhesives, which may themselves serve as additional spacers. The edges of the metalens and spacer may be blackened or roughened. In an alternative method, the aperture and metasurface can be combined onto one substrate, i.e., the aperture and the metasurface are patterned on the opposite sides of a single substrate. The aperture may be an optical aperture or a mechanical aperture (e.g., a frame for packaging, supporting, etc.).

The metasurface or portions of the metasurface may be designed to be sensitive to the incident/exiting angles or location of light. For example, different regions of the metalens are configured to have different modulation behavior (e.g., transmittance, phase delay, polarization modulation, spectral responses, etc.) depending on the light incident or exiting angles or locations on the metasurface. In one example, a metasurface, one or multiple regions of a metasurface or surrounding regions of a metalens may be designed to deflect, reflect, absorb, diffract, or block light and thereby act as an aperture or light baffle element, which can be useful for confining the propagation of light or reduce/block stray light. For example, metasurface gratings or other meta-optics structures/components may be designed to deflect the light or improve the optical efficiency of the metasurface for light inside or outside certain incident/exiting angular ranges or diffraction orders. Such metasurface optics components may be optimized for different incident/exiting angles or diffraction orders. The dimensions, geometries and/or pitches of meta-atoms are optimized to improve the diffraction efficiency of the target diffraction angle θ under certain incident/exiting angle α (or a range of angles). The design starts with the unit cell full-wave simulation of the meta-atoms with period and incident angle determined by the requirement. In one example, an 8 meta-atom library is generated with phase delay covering 0-2π range. The meta-optics is subsequently built up from the library, and full wave simulations (e.g., RCWA, FDTD, FEM, etc.) is utilized to perform the simulation of diffraction efficiency of the meta-optics (e.g., in the form of a meta-grating. In one example, the AOI-dependent design shows 3 times diffraction efficiency compared to the meta-atoms designed for normal incidence, and thereby can be used for metasurface regions with off-axis incident light or effectively deflect stray light. Such design methods can be used for not only grating structures but generally for other metasurfaces (e.g., metalenses).

Figures 5A, 5B:
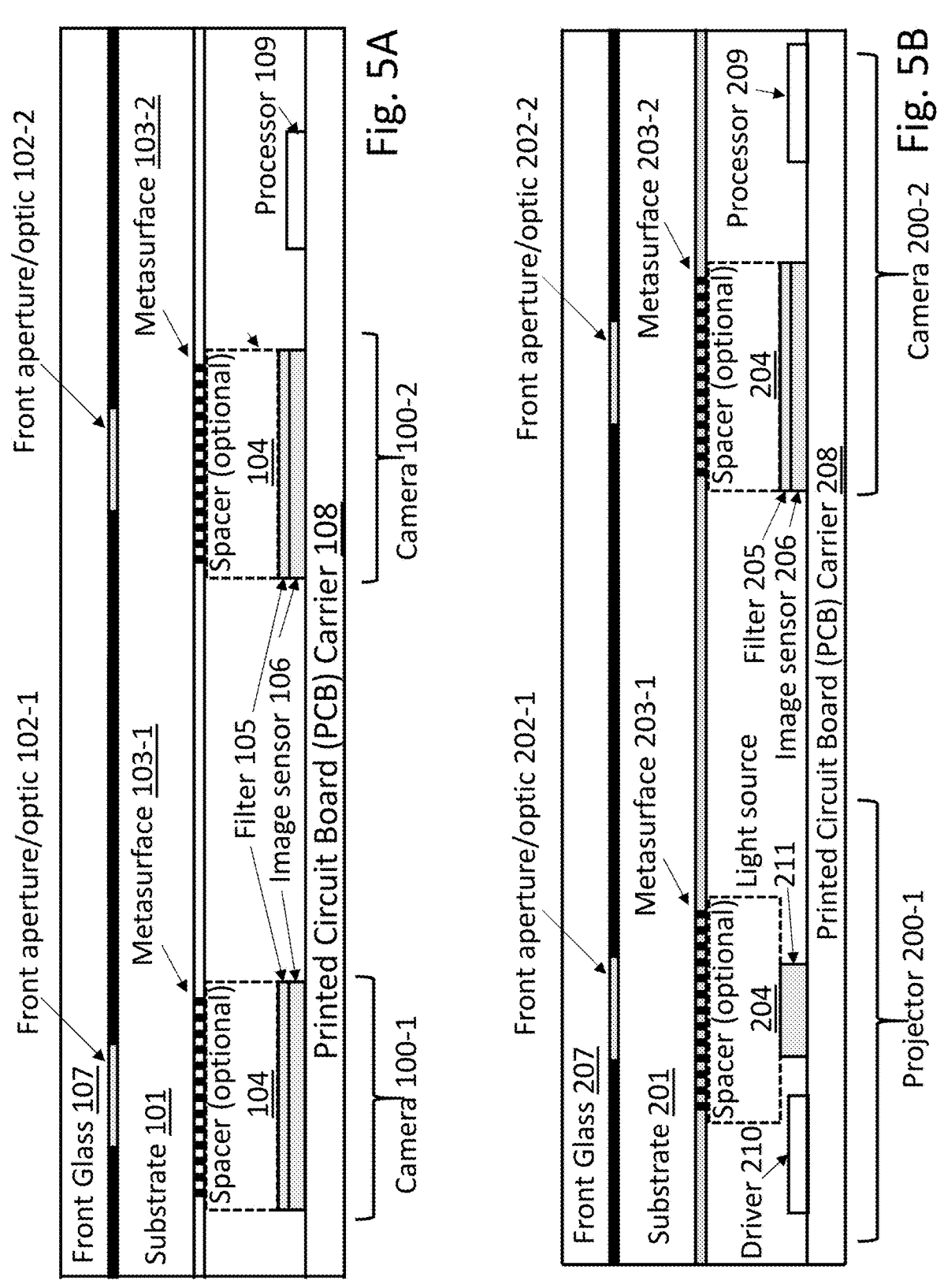
FIGS. 5A-5C schematically illustrate sensor device modules integrating metasurface flat optics according to embodiments of the present invention.
Figure 5C:
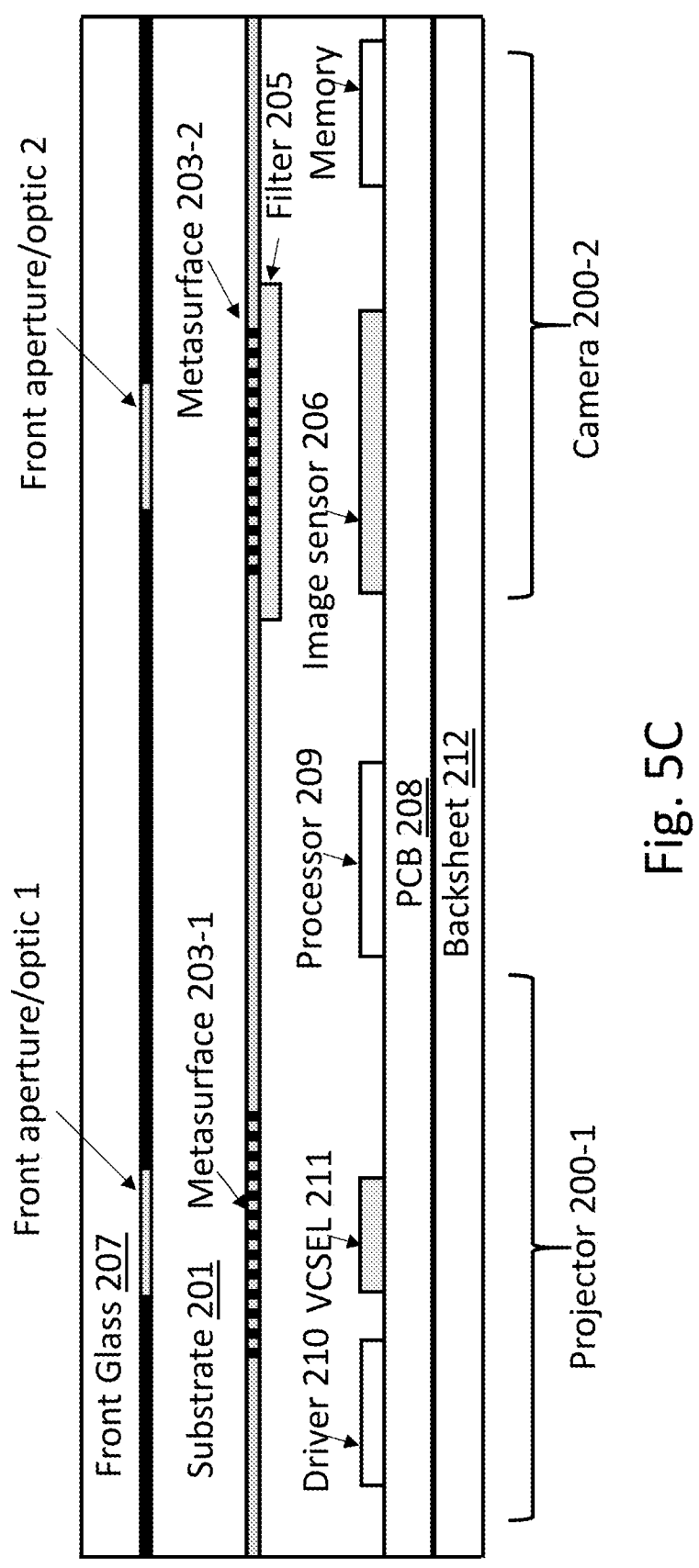

FIGS. 5A-5C schematically illustrate sensor device modules integrating metasurface flat optics according to embodiments of the present invention.

As schematically illustrated in FIG. 5A, an exemplary stereoscopic 3-D sensor module includes two sub-modules, namely, a first camera 100-1 and a second camera 100-2, each containing a wide-FOV metalens (metasurface 103-1 and metasurface 103-2, respectively, with corresponding apertures 102-1 and 102-2, formed on the substrate 101) and an imager sensor 106. The image sensors 106 are further integrated with respective optical filters 105. In some embodiments, spacers 104 may be included between the filters 105 and the metasurfaces 103-1 and 103-2. In the illustrated embodiment, the two metasurfaces 103-1 and 103-2 are integrated as one piece, while the two image sensors (with the corresponding filters and optional spacers) are separate pieces. The image sensors 106, as well as an image processor 109 and other electronic components are mounted on a printed circuit board (PCB) 108. In the illustrated embodiment, a front glass 107 is also provided to cover the front side of the substrate.

FIG. 5B illustrates an exemplary imager/sensor with active illumination (e.g., a structured light or TOF 3-D sensor module or other imager/sensors coupled with an illumination source). The module includes two sub-modules, namely, a projector 200-1 which includes a light source 211 (e.g., VCSEL or LED, or light arrays), driver chip 210 for the light source, and a meta-projector optics (first metasurface 203-1 with corresponding aperture 202-1, formed on the substrate 201) to generate a high-resolution illumination pattern (such as a dot array), and an imager (camera) 200-2 which contains a wide-FOV metalens (second metasurface 203-2 with corresponding aperture 202-2, formed on the substrate 201) to capture images of the pattern and map it onto an imager sensor 206. A filter 205 is integrated with the image sensor 206. Optional spacers 204 may be provide in the protector 200-1 and the camera 200-2. The projector meta-optics may be inversely designed and co-optimized with the imager meta-optics to provide a large FOV up to 180 degrees and high-resolution illumination and detection. The image sensors 206, its associated image processor 209, the light source 211 and its driver 210, as well as other suitable electronic components, are mounted on a printed circuit board (PCB) 208. In the illustrated embodiment, an optional front glass 207 is also provided to cover the front side of the substrate.

FIG. 5C illustrates imager/sensor module similar to that shown in FIG. 5B, but the spacers 204 are omitted, and the filter 205 is formed on the second metasurface 203-2 rather than on the image sensor 206. As a result, an air gap is present between the light source (VCSEL) 211 and the first metasurface 203-1, and between the image sensor 206 and the filter 205. The air gaps are maintained by a mechanical mounting and/or spacer structure (not shown in FIG. 5C) that mounts the substrate 201 (with the metasurfaces) on the PCB 208. Further, an optional backsheet 212 is provided below the PDB 208.

In the examples of FIGS. 5A-5C, the front apertures may be further integrated with another optical component (e.g., a flat optics or a filter) to provide additional modulation of the incident light. Refractive or reflective optics (e.g., lenses or mirrors) may also be used to form a hybrid optical system. Distinct form existing imager/sensors (e.g., 3-D sensors) that involve discretely-packaged optical and optomechanical modules, the meta-optics (metalenses and meta-projector optics) in the embodiments of FIGS. 5A and 5B are co-planarly integrated on a single common substrate, which eases assembly and allows further functionality scaling.

Figure 6:
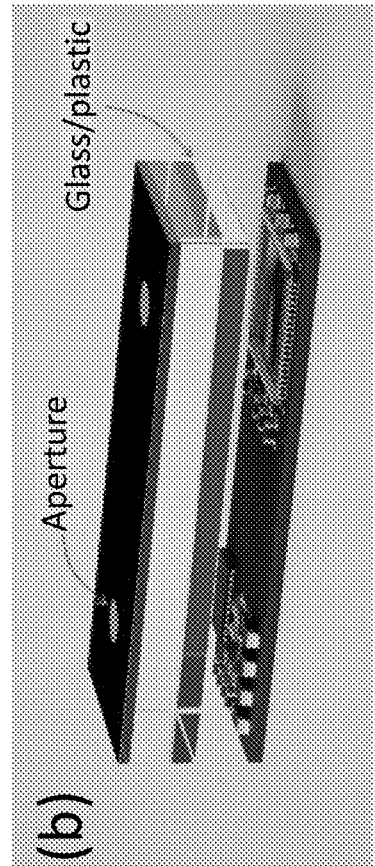
FIG. 6 shows an exemplary sensor/imager module useful for 3-D sensors or other imaging, sensing, or projection applications similar to that shown in FIG. 5B, in perspective views.
Figure 6:
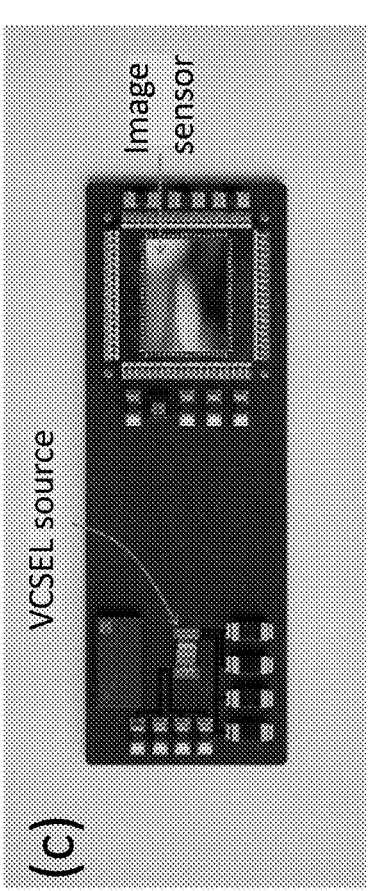
Figure 6:
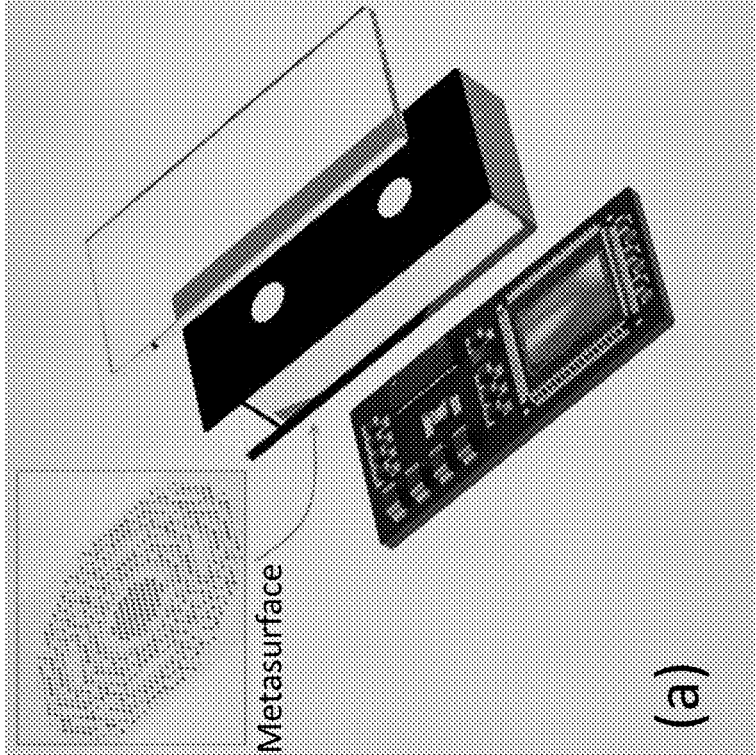

FIG. 6 shows an exemplary imager/sensor module (e.g., a 3-D sensor module) similar to that shown in FIG. 5B, in perspective views. Panel (a) is an explosive view and panel (b) is a perspective view of the sensor module; panel (c) is a top view of the PCB.

Figure 7:
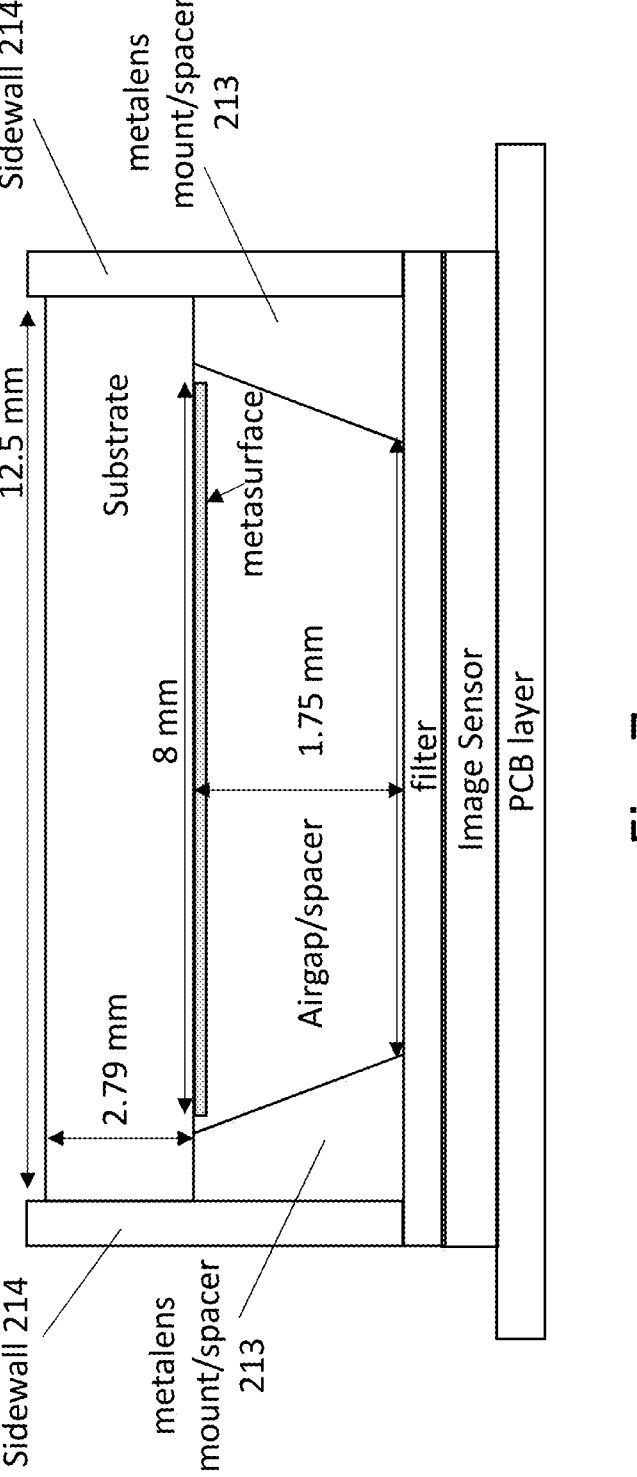
FIG. 7 illustrates another exemplary camera module according to an embodiment of the present invention.

FIG. 7 shows another exemplary camera module. The metalens mounting and spacer structure 213 is shown, which is located between the substrate and the filter around the area of the metasurface and the filter. The metalens mounting and spacer structure 213 and the substrate are surrounded by a sidewall 214. The various dimensions shown in FIG. 7 are exemplary and not limiting.

The 3-D sensors modules shown in FIGS. 5A, 5B and 6 overcome traditional trade-offs between performance, complexity and size, and uniquely combine high resolution, panoramic FOV, enhanced SNR, and a thin and light-weight device structure.

The structures of sensor device module shown in FIGS. 5A and 5B may be used to implement other devices such as a near IR or short-wave IR camera which may be similar to cameras 100-1, 100-2 or 200-2 but without the processor, or an illuminator similar to the projector 200-1 but without the driver.

In the above embodiments, the metasurfaces may be more generally flat optics layers which may be, in addition to metasurfaces, diffractive optical elements, holograms, gradient refractive index (GRIN) optical elements, etc. The front aperture may be further integrated with another optical component (e.g., a flat optics or a filter) to provide additional modulation of the light. Refractive or reflective optics (e.g., lenses or mirrors) may also be used to form a hybrid optical system.

Various other alternative embodiments are possible. For example, apertures or light baffles may be patterned, integrated or assembled on one or multiple optical component layers in the various embodiments described above, which function to confine the light propagation or reduce or block stray light. The light baffles may be, for example, absorptive and/or reflective coatings such as black or metal coatings, or deflecting optical structures.

In another alternative embodiment, the space between the front aperture 12 and the metasurface 31 may be an airgap.

The wide-FOV sensor structures described above may be designed and optimized for different types of applications, such as driver monitoring systems (DMS), eye trackers, AR/VR (augmented reality/virtual reality) devices, etc.

It will be apparent to those skilled in the art that various modification and variations can be made in the wide field-of-view metasurface 3-d sensors and cameras and related method of the present invention without departing from the spirit or scope of the invention. Thus, it is intended that the present invention cover modifications and variations that come within the scope of the appended claims and their equivalents.

The invention claimed is:

1. A sensor device comprising:
   a transparent substrate;
   an opaque material layer over a first side of the substrate that contains at least one aperture;
   a chip stack joined to a second side of the substrate opposite the first side, the chip stack including:
   a flat optics layer, wherein the flat optics layer is a metasurface;
   at least one spacer layer;
   a filter layer, wherein the filter layer includes one or more multilayer interference coating filter; and
   an image sensor, located at a defined distance from the flat optic layer.

2. The sensor device of claim 1, wherein the flat optics layer includes a metasurface, a diffractive optical element, a hologram, or a gradient refractive index (GRIN) optical element.

3. The sensor device of claim 1, wherein the flat optics layer includes a metasurface, the metasurface spatially corresponds to one of the at least one aperture to form a near telecentric metalens.

4. The sensor device of claim 1, wherein the flat optics layer is formed of a metasurface structure which is configured to control the optical phase, amplitude, polarization and/or spectrally, angularly and/or polarization dependent transmission, reflection and/or beam shaping profiles of an incident light.

5. The sensor device of claim 1, wherein the at least one aperture includes a first aperture and a second aperture,
the sensor further comprising a second chip stack which includes:
a second flat optics layer;
at least one second spacer layer; and
a second image sensor, located at a defined distance from the second flat optics layer,
wherein the chip stack and the second chip stack respectively spatially correspond to the first and second apertures, wherein the flat optics layer and the second flat optics layer are configured to perform different functions according to different properties of light.

6. The sensor device of claim 5, wherein the chip stack further includes a first filter layer, the second chip stack further includes a second filter layer, wherein the first filter layer and the second filter layer are configured to have different light filtering properties according to the different functions of the flat optics layer and the second flat optics layer, respectively.

7. The sensor device of claim 5, further comprising:
a printed circuit board, wherein the image sensor of the chip stack and the second image sensor of the second chip stack are mounted on the printed circuit board; and
an image processor mounted on the printed circuit board.

8. The sensor device of claim 1, wherein the at least one aperture includes a first aperture and a second aperture,
the sensor further comprising a second chip stack which includes:
a second flat optics layer;
at least one second spacer layer; and
a light source, located at a defined distance from the second flat optics layer,
wherein the chip stack and the second chip stack respectively spatially correspond to the first and second apertures, and
wherein the second flat optics layer is configured to transform a light emitted by the light source into a defined 2-dimensional or 3-dimensional optical intensity distribution.

9. The sensor device of claim 8, wherein the second chip stack further includes a second filter layer.

10. The sensor device of claim 8, further comprising:
a printed circuit board, wherein the image sensor of the chip stack and the light source of the second chip stack are mounted on the printed circuit board;
a light source driver chip mounted on the printed circuit board; and
an image processor mounted on the printed circuit board.

11. The sensor device of claim 1, wherein the at least one aperture includes a first aperture and a second aperture, wherein the flat optics layer includes a first metasurface and a second metasurface spatially corresponding to the first and second apertures, respectively, and wherein both the filter layer and the image sensor spatially overlap areas of the first and second metasurfaces.

12. The sensor device of claim 1, wherein the at least one aperture includes a first aperture and a second aperture, wherein the flat optics layer includes a first metasurface and a second metasurface spatially corresponding to the first and second apertures, respectively, wherein the filter layer includes a first filter and a second filter spatially corresponding to the first and second apertures, respectively, and wherein the image sensor spatially overlaps areas of the first and second metasurfaces and the first and second filters.

13. The sensor device of claim 1, wherein the at least one aperture includes a first aperture and a second aperture, wherein the filter layer includes a first filter and a second filter spatially corresponding to the first and second apertures, respectively, wherein both the flat optics layer and the image sensor spatially overlap areas of the first and second filters.

14. The sensor device of claim 1, wherein the flat optics layer is located between the image sensor and the substrate, the at least one spacer layer includes a first spacer layer located between the flat optics layer and the image sensor, and the filter layer is located between the first spacer layer and the image sensor.

15. The sensor device of claim 14, wherein the at least one spacer layer further includes a second spacer layer located between the filter layer and the image sensor.

16. The sensor device of claim 1, wherein the flat optics layer is located between the image sensor and the substrate, the filter layer is located between the flat optics layer and the image sensor, and the at least one spacer layer includes a first spacer layer located between the filter layer and the image sensor.

17. The sensor device of claim 1, wherein the image sensor is a complementary metal-oxide-semiconductor (CMOS) image sensor wafer, wherein the filter layer is a multilayer thin films or a patterned metasurface layer formed on a substrate and assembled to the image sensor wafer, and wherein the flat optics layer is a metasurface formed on substrate and assembled to the filter layer.

18. The sensor device of claim 1, wherein the flat optics layer and the filter layer are formed of a metasurface structure which is configured to control the optical phase, amplitude, polarization and/or spectrally, angularly and/or polarization dependent transmission, reflection and/or beam shaping profiles of an incident light.

19. The sensor device of claim 1, wherein the flat layer is patterned on top of the one or more multilayer interference coating filter or sandwiched between two of the one or more multilayer interference coating filters.

20. The sensor device of claim 1, wherein the flat optics layer and the filter layer are formed of a multilayer stacked metasurface or optical structures configured to impart optical phase, amplitude modulation, polarization sensitivity, and/or spectrally and/or angularly dependent filtering and/or beam shaping on an incident light.

21. The sensor device of claim 1, further comprising a filter covering each of the at least one aperture.

22. The sensor device of claim 1, wherein the at least one spacer layer includes a first spacer layer which is an air gap.

23. A projector device comprising:
a transparent substrate;
an opaque material layer over a first side of the substrate that contains at least one aperture;
a chip stack joined to a second side of the substrate opposite the first side, the chip stack including:

a flat optics layer, wherein the flat optics layer is a metasurface;

at least one spacer layer;

a filter layer, wherein the filter layer includes one or more multilayer interference coating filter;

and a light source or light source array, located at a defined distance from the flat optics layer.

\* \* \* \* \*